United States Patent [19]

Neverson

[11] Patent Number: 4,660,878
[45] Date of Patent: Apr. 28, 1987

[54] MOTOR VEHICLE SECURITY DEVICE

[76] Inventor: Thomas L. Neverson, 647 New St., Uniondale, N.Y. 11553

[21] Appl. No.: 801,283

[22] Filed: Nov. 25, 1985

[51] Int. Cl.$^4$ ............................................. B62D 25/00
[52] U.S. Cl. .................................... 296/1 R; 70/199; 180/287
[58] Field of Search ................. 296/1 R; 70/199, 192, 70/230; 160/33, 36; 280/727; 180/287

[56] References Cited

U.S. PATENT DOCUMENTS

| | | | | |
|---|---|---|---|---|
| 1,438,169 | 12/1922 | Christensen | ............................ | 70/199 |
| 1,448,462 | 3/1923 | Ryan | .................................... | 70/199 |
| 1,731,439 | 10/1929 | Riehl | ..................................... | 70/237 |

Primary Examiner—Robert R. Song
Attorney, Agent, or Firm—Philip H. Gottfried

[57] ABSTRACT

A security device for a motor vehicle is disclosed, having a protective curtain made of a material of sufficient area and strength so that the curtain is able to conceal and prevent the unauthorized use of the motor vehicle's control pedals. The curtain also has sufficient flexibility so that it may be adjusted from a substantially-vertical, closed position, where the control pedals of the vehicle are concealed, to a substantially-horizontal open position where virtually unimpeded access to the vehicle's control pedals, and operation of the vehicle, is possible.

21 Claims, 7 Drawing Figures

MOTOR VEHICLE SECURITY DEVICE

This invention relates generally to a motor vehicle security device. More particularly, this invention relates to an improved motor vehicle security device contained within the passenger compartment of an automobile, which utilizes a flexible curtain to shield at least the control pedals of the automobile when the vehicle is not in use.

Security devices of this type generally include a rigid plate which must be rotatable along an axis to uncover the control pedals. Such a plate, if it is not to interfere with the comfort and convenience of the driver or front seat passengers or with the safe operation of the vehicle, should generally be positioned on the floor of the vehicle, preferably, beneath the driver's seat when not covering the control pedals. This type of construction requires that the driver's seat be positioned a sufficient distance away from the dashboard so that the plate may be rotated and lie flat on the floor when the vehicle is being operated.

In the prior art, there is provided a pedal control screen, or plate, of rigid construction that prevents access to the vehicle's control pedals when properly locked into place. For example, in the patent to T. A. Ryan, U.S. Pat. No. 1,448,462, issued Mar. 13, 1923, there is shown a rigid plate (7) which is secured by hinges (8, 9) at its lower edge to the floor of the vehicle. The driver's seat must be either fixed in place or adjusted and readjusted so that when the plate is rotated from one position to the other, the driver's seat is outside of the arc created by, and does not interfere with, the rotation of the plate. The prior art fails to disclose or suggest a means for constructing a flexible screen or curtain, that properly shields the control pedals from unauthorized use, that eliminates the requirement that either the driver's seat be fixed at a position a sufficient distance away from the dashboard, that does not compromise safety in favor of the proper operation of the apparatus, or avoids the time-consuming and inconvenient chore of having to adjust and readjust the driver's seat to properly position the device; and, permit operation of the vehicle.

Accordingly, the present invention overcomes many of the disadvantages of the prior art by providing a flexible curtain that is secured by a track within a frame which guides the curtain between a substantially vertical, first, closed position, that when locked in place, securely shields the control pedals of the automobile from unauthorized use, to a substantially horizontal, second, open position, which allows for operation of the vehicle by securing the flexible curtain beneath the driver's seat, and back. The curtain is to be of a strong and durable, yet flexible, material, preferably aluminum, which is to be hardened after forming. To ensure proper enclosure of the pedal control area of the vehicle, the upper edge of the frame containing the curtain should be fixed to the lower edge of the dashboard. The lower edge of the frame, which is on the floor beneath the driver's seat, should extend a distance away from the lower edge of the vertical plane created by the curtain when in a closed mode. By this construction, when in the open mode, the flexible curtain is able to lie flat under the driver's seat to ensure safe and unhindered operation of the vehicle.

Preferably, a reversible electric motor, which can be located at any point along the security device, is utilized to carry the flexible curtain along the track. For added convenience, limit switches may be positioned at the top and bottom of the track within the path of the protective curtain to stop the power to the motor once the respective upper and lower limits of travel thereof have been reached.

In a preferred embodiment of the invention, a segmented metal screen, of the type sometimes utilized to protect store front windows, e.g., that shown in the patent to H. S. Riehl, U.S. Pat. No. 1,731,439, issued Oct. 15, 1929, is employed as the protective curtain. Such a screen has the beneficial features of being both durable and flexible.

In an auxiliary feature of the present invention, it is also desirable, if the design of the motor vehicle permits, to have the curtain, when in the closed position, cover other control apparatus of the car, such as the hood and trunk releases. Likewise, the radio may be positioned to be shielded behind the curtain in its closed position to secure it against theft.

Accordingly, it is an object of the present invention to provide an improved motor vehicle security device which has a flexible construction and which may be safely and conveniently utilized.

It is also an object of the invention to provide a security device which is of simple and economical construction, yet durable.

It is a further object of the invention to provide a security device that is aesthetically pleasing.

Other objects and features of the present invention will become apparent from the following detailed description when taken in conjunction with the accompanying drawing, which discloses several embodiments of the invention. It is to be understood that the drawing is designed for the purpose of illustration only and is not intended as a definition of the limits of the invention.

In the drawing, wherein similar reference numerals denote similar elements throughout the several views.

Figure 1:
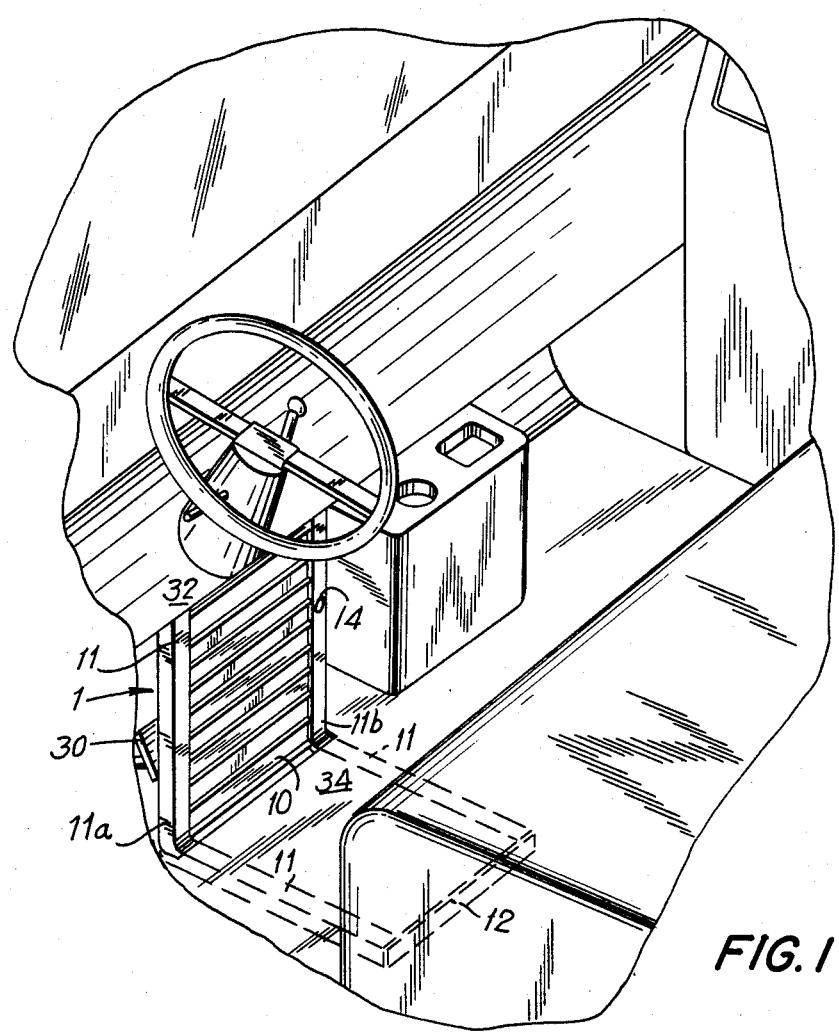
FIG. 1 is a fragmentary perspective view of the security device of the present invention, shown in the closed position.

Referring to FIG. 1, there is shown an automobile security device of the present invention, generally designated by the reference numeral 1, secured beneath a dashboard of a motor vehicle. A flexible curtain 10 of the device is held in place by a frame 11 having lower and upper cross-bar frame members 12, 13 (see FIG. 3). The frame 11 is shown in the closed position in FIG. 1, in which position it conceals the vehicle's control pedals 30 (partially shown) and prevents their unauthorized use. As presented, left and right side members 11a and 11b of frame 11 extend vertically downward from the lower edge of the dashboard 32 to the vehicle's floor whereupon they curve and extend substantially horizontally (shown in phantom) beneath the floor 34 of the automobile and under the driver's seat 36 (see FIG. 2). Locking means and, preferably, a combination key lock and momentary actuation switch 14 are provided along the vertical section of frame 11 to lock the flexible screen in the closed position when the vehicle is not in use and in an open position when the vehicle is being operated. Unlocking the locking means permits movement of the flexible screen from one position to the other as well as activating the reversible electric motor to effectuate such movement.

Figure 2:
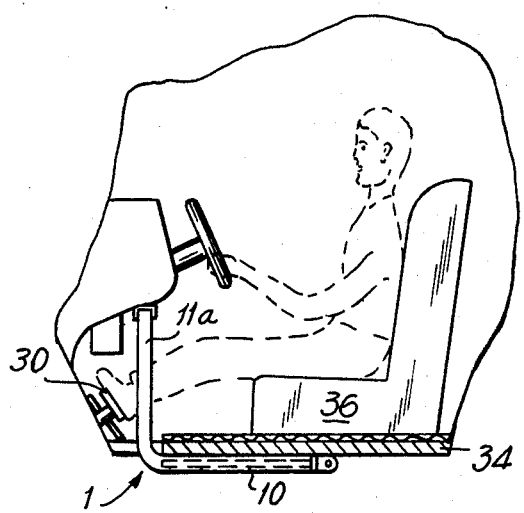
FIG. 2 is a left side elevational view showing the security device in the open position with a prospective user of the motor vehicle shown in phantom.

FIG. 2 illustrates the open position of the present invention and how a prospective driver would position himself in relation to the device 1. The flexible curtain 10 is shown lying horizontally beneath the vehicle's floor 34 so that it in no way obstructs the operation of the vehicle and permits unimpeded access to the control pedal 30.

Figure 3:
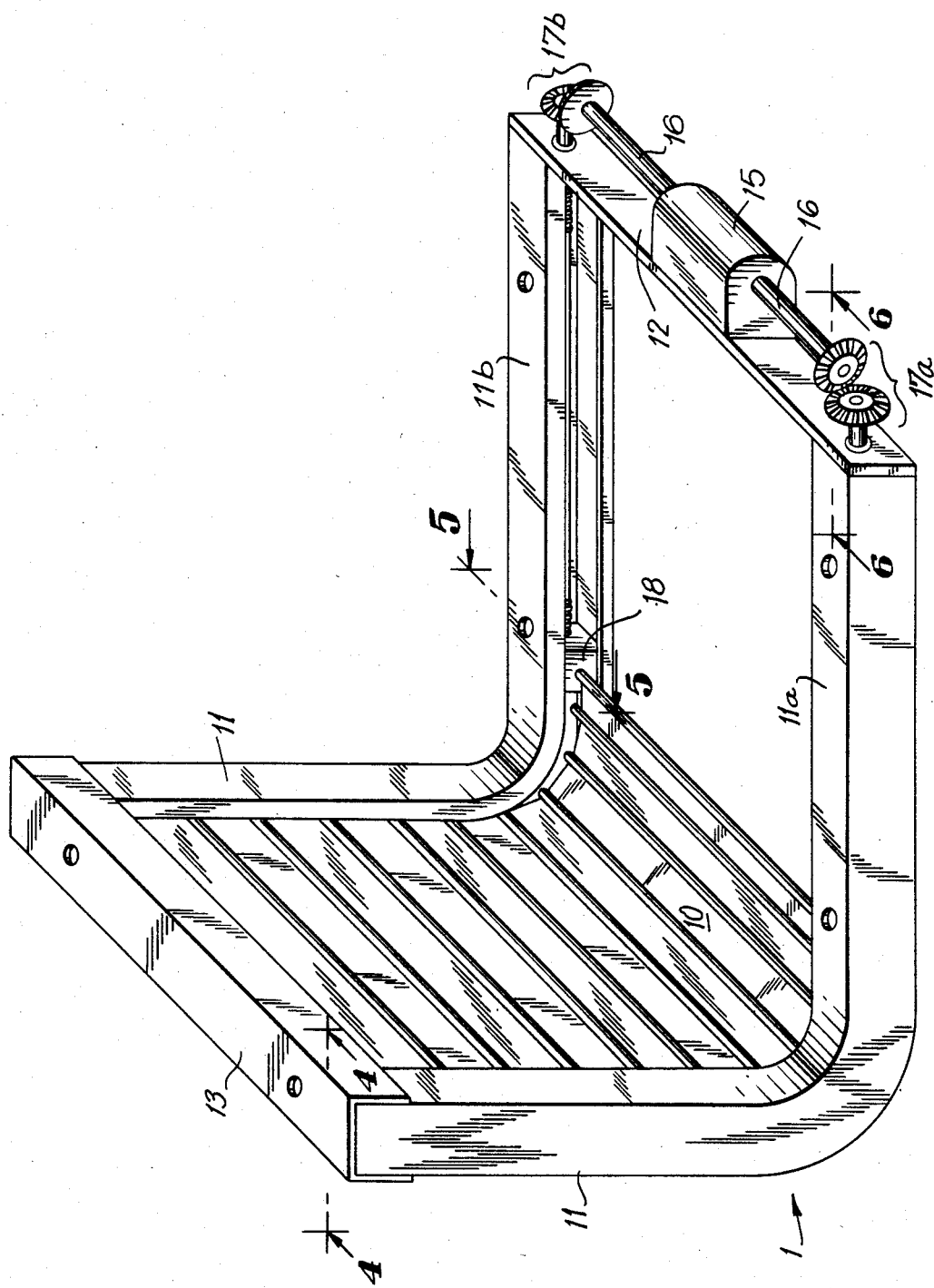
FIG. 3 is an enlarged left side perspective view of the security device shown in the closed position.

FIG. 3 shows that the flexible curtain 10 is a series of interconnected members to be described in greater detail hereinafter. The construction of frame 11 includes left and right side members 11a, 11b, each of which is a rectangular, open-sided channel which acts as a track for and guides respective left and right sides of the protective curtain in its movement from the closed position (FIGS. 1 and 3) to the open position (FIG. 2) and back again or vice versa. Located centrally on the outer side of the lower cross-bar frame member 12 of the frame 11 is a housing 15 which contains a conventional reversible D.C. electric motor (not shown). Extending outwardly, and parallel to the lower cross-bar frame member 12, is a rod 16 with each end of the rod connected to a bevel gear arrangement 17a, 17b. Each bevel gear arrangement is connected to a block 18 (only one is visible in FIG. 3), located on the track created by the channel in each side frame member 11a, 11b. The blocks 18 are each, in turn, connected in a manner to be described in detail hereinafter to the lower edge of flexible curtain 10 to place the curtain in one of the two desired positions.

As shown in FIG. 3, the security device 1 is in the closed position. Upon activation of the motor within the housing 15, the bevel gear arrangements 17a, 17b retract the blocks 18 toward the lower cross-bar frame member 12 causing the flexible curtain 10 to be drawn toward the lower cross-bar frame member, into the open position thereby allowing use of the vehicle's control pedals.

Figure 4:
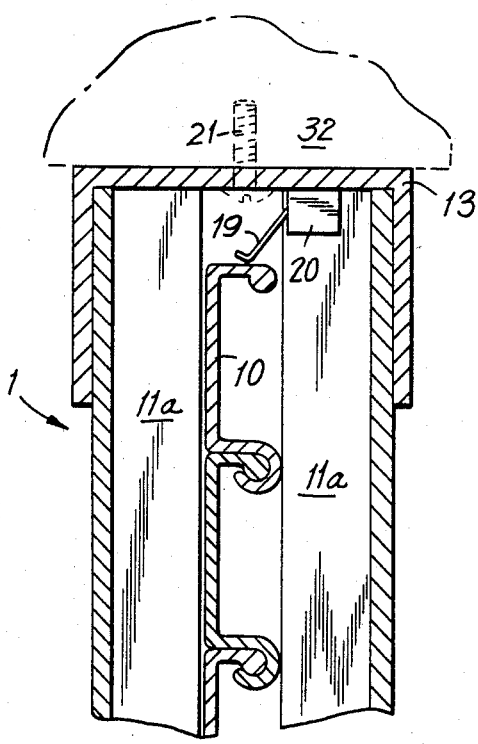
FIG. 4 is an enlarged left side fragmentary, elevational, sectional view of the security device taken along the line 4—4 of FIG. 3 and looking in the direction of the arrows.

FIG. 4 shows the curtain 10 and a frame member 11a of the security device 1. Upper cross-bar frame member 13 contacts the lower edge of the dashboard 32 and is fixed thereto, for example, by bolts 21. Within the inverted U-shaped channel of the cross-bar member 13, frame 11a is contained, containing flexible curtain 10 within its own channel. In the preferred embodiment shown, the curtain 10 is a segmented metal curtain which employs horizontally extending hinges at the respective top and bottom sides along their entire length so that the curtain has the necessary flexibility to be adjustable between the closed position (FIG. 3) and the open position (FIG. 2).

FIG. 4 also illustrates a preferred means for automatically shutting off the motor within the housing 15 (see FIG. 3) used to move the curtain 10, once the curtain has reached its second, fully-closed position where it conceals the automobile's pedals. Presented is a resilient upper-limit control arm 19 connected to a switch 20 positioned on the inner side of frame 11. Upon movement of the curtain 10 from the open position to the closed position (compare FIG. 2 with FIG. 3), the upper edge of the curtain contacts and actuates upper limit control arm 19. Once actuated, upper limit control arm 19 activates switch 20 to open the same in a manner that will interrupt the flow of current to the motor in housing 15 and thereby cause any further movement of the curtain 10 to cease.

Figure 5:
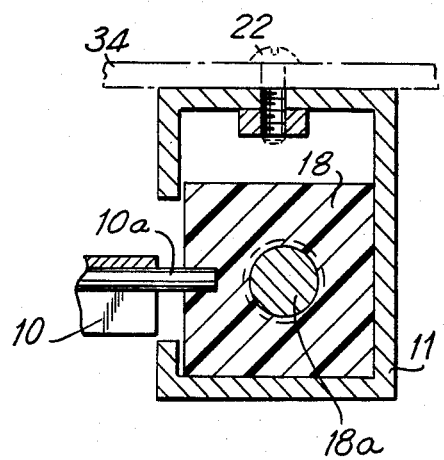
FIG. 5 is an enlarged front, partial, sectional view of the security device taken along the line 5—5 of FIG. 3 and looking in the direction of the arrows.
Figure 6:
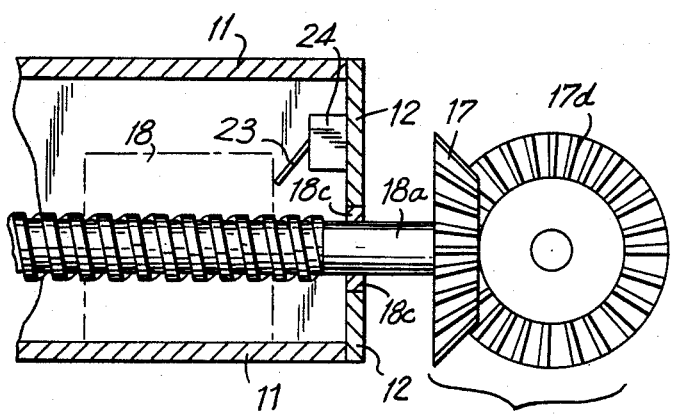
FIG. 6 is an enlarged detailed view of a power transmission means of the motor for use with the security device, showing the lower limit switch located on the inner side of the frame containing the flexible curtain.

FIG. 5 shows one of the internally-threaded blocks 18 which mates with and is carried on threaded shaft 18a which is fixed to bevel gear 17 which, in turn, mates with gear 17d of bevel gear arrangement 17b (see FIGS. 3 and 6). The blocks 18 (one of each which is carried in each of the channels of the frame 11), are each connected (by an entrapped pin 10a as shown in FIG. 5) to the lower edge of flexible curtain 10. By the motor within housing 15 operating the bevel gear arrangement 17a, 17b, which is connected to blocks 18 and holds the lower edge of curtain 10, the curtain may be adjusted between the closed and open positions. FIG. 5 also shows that frame 11 may be fixed in place to the underside of the floor 34 by any conventional means such as by a nut-and-bolt combination 22.

FIG. 6, in an analogous fashion to the apparatus shown in FIG. 4, illustrates a preferred means for automatically shutting off the motor used to move the flexible curtain 10, to its fully open position to allow access to the vehicle's control pedals. Presented is the bevel gear arrangement 17b wherein an unthreaded end of threaded shaft 18a is shown extending through an opening 18c in lower cross-bar frame member 12 and mating with internally-threaded block 18 which, in turn, is connected to the lower edge of the flexible curtain 10 (not shown). As the flexible curtain 10 is being moved from the closed position to the open position, the bevel gear arrangement 17b crawls toward the block 18. As the block approaches lower cross-bar frame member 12, with the security device now approaching the fully-open position, a means for ceasing the flow of current to the motor is provided. A preferred mechanism for sensing and stopping the movement of the curtain, once the open position is fully attained, utilizes a resilient lower limit control arm 23 connected to a switch 24. When the lower limit control arm 23 is depressed by the lower end of the curtain 10 bearing thereagainst, the switch 24 is activated to open thereby interrupting the flow of current to the motor within the casing 15 and causing movement of the curtain 10 to cease thereby leaving the security device in the open position.

Figure 7:
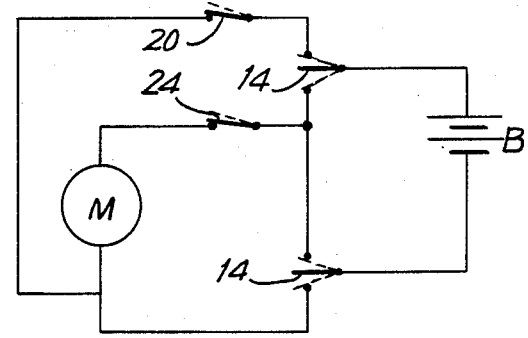
FIG. 7 is a schematic diagram of the electrical connection between the motor and the vehicle's battery, showing actuation and limit switches.

FIG. 7 shows a schematic diagram of the electrical connection between motor M, a power source B for the device 1, and the switches 14, 20, and 24. The switches 20 and 24 are normally in the closed position whereas the switch 14 is normally in the open position. Upon entering the vehicle, the prospective driver will insert a key of conventional design into and turn the device's switch 14 to the "open" position. The "open" position will establish a connection between the battery B and the motor M which will then be activated to cause the threaded rod 18a to turn through the connection of the motor M through the rod 16 and the bevel gear arrangement 17a, 17b, and the flexible curtain will be drawn toward the open position. As the block 18 that is connected to the rods 19a through the bevel gear arrangements 17a, 17b (shown in FIGS. 3, 5, and 6) depresses the lower limit switch 23, control switch 24 is opened thereby breaking the electrical connection to the reversible motor in housing 15 and ceasing movement of the curtain 10 and securing it in the open position. This permits access to the vehicle's control pedals for safe operation. Upon completion of driving, when the driver desires to secure the vehicle by repositioning the security device 1 in the closed position, switch 14 is turned to the closed position thereby completing the circuit through switch 20 and activating the motor M in housing 15. Upon activation of the motor, blocks 18 connected to the bevel gear arrangements 17a, 17b proceed away from, and release, the lower limit switch 23 thereby allowing switch 24 to reclose. As the flexible curtain 10 reaches the closed position along the tracks of the frame members 11a, 11b, the curtain 10 depresses the upper limit control arm 19 thereby causing switch 20 to open and cease the flow of power to the reversible motor in housing 15 thereby stopping movement of the curtain 10 in the closed position. As a result, the vehicle's control pedals are concealed and prevent unauthorized use of the vehicle.

It should be apparent that other variations may be made as will be apparent to those skilled in the art. For example, many types of flexible materials may be used for the curtain of the device. In addition, movement of the security device between the open position and the closed position may be accomplished manually.

Thus, while only several embodiments of the present invention have been shown and described, it will be obvious that many changes and modifications may be made thereunto, without departing from the spirit and scope of the invention.

What is claimed is:

1. A security device for a motor vehicle, comprising:
    a movable protective curtain made of a material of sufficient area and strength so that said curtain is capable of concealing and preventing the unauthorized use of control pedals of the motor vehicle, said curtain also being of sufficient flexibility so that it is adjustable between a first position, wherein it conceals the control pedals, and a second position, wherein it allows access to the control pedals and operation of the vehicle;
    a generally L-shaped frame, having a pair of parallel side frame members forming guide tracks for said curtain, an upper cross-bar member interconnecting the upper end portions of said side frame members adjacent the dashboard of the motor vehicle, and a lower cross-bar member interconnecting the lower end portions of said side frame members adjacent a front seat of the motor vehicle, to contain said protective curtain, said frame being fixed to the interior of the motor vehicle proximate the control pedals and being constructed and arranged to position said guide tracks to guide said curtain when moving the same between said first position and said second position;
    means for moving said curtain between said first position and said second position; and,
    means for locking and securing said curtain in said first position when the motor vehicle is not in use.

2. The security device according to claim 1, wherein said curtain is made of metal.

3. The security device according to claim 2, wherein said curtain is made of aluminum.

4. The security device according to claim 1, wherein said curtain is made of plastic.

5. The security device according to claim 1, wherein said curtain is horizontally-segmented with hinges for added flexibility.

6. The security device according to claim 1, wherein said upper cross-bar member of said frame is affixed to the lower edge of the dashboard of the motor vehicle.

7. The security device according to claim 1, wherein said lower cross-bar member of said frame is beneath a driver's seat of the motor vehicle and extends a sufficient distance away from the front edge of the driver's seat so that when said curtain is in said second position, said curtain is able to lie flat under the seat.

8. The security device according to claim 1, wherein said means for movement of said curtain is by way of a reversible direction electric motor.

9. The security device according to claim 8, wherein said electric motor is connected to a bevel gear arrangement that is, in turn, connected to the lower edge of said curtain to adjust the position thereof.

10. The security device according to claim 8, further comprising an upper limit switch for deactivating said electric motor when contacted by said curtain when such curtain is in said first position.

11. The security device according to claim 8, further comprising a lower limit switch for deactivating said electric motor when contacted by said curtain when said curtain is in said second position.

12. The security device according to claim 1, wherein said means for movement of said curtain is manual.

13. The security device according to claim 1, wherein said curtain further conceals a hood release device for the motor vehicle.

14. The security device according to claim 1, wherein said curtain further conceals a trunk release device for the motor vehicle.

15. The security device according to claim 1, wherein said curtain further conceals a radio for the motor vehicle.

16. The security device according to claim 1, wherein said means for locking is a combination key lock and momentary actuation switch.

17. A security device for a motor vehicle, comprising:
    a movable protective curtain made of metal that is horizontally-segmented with hinges having sufficient area and strength so that said curtain is capable of concealing and preventing the unauthorized use of control pedals of the motor vehicle, said curtain also being of sufficient flexibility so that it is adjustable between a first position, wherein it conceals the control pedals, and a second position, wherein it allows access to the control pedals and operation of the vehicle;
    a generally L-shaped frame, having a pair of parallel side frame members forming guide tracks for said curtain, an upper cross-bar member interconnecting the upper end portions of said side frame members adjacent the dashboard of the motor vehicle, and a lower cross-bar member interconnecting the lower end portions of said side frame members adjacent a front seat of the motor vehicle, to contain said protective curtain, said frame being fixed to the interior of the motor vehicle proximate the control pedals and being constructed and arranged to position said guide tracks to guide said curtain when moving the same between said first and said second position;

a reversible electric motor located on an outer surface of said lower cross-bar member of said frame, said motor being connected to two bevel gear arrangements positioned at opposite ends of said lower cross-bar member with each of said gear arrangements having a threaded shaft extending through an opening in said lower cross-bar member and operatively engaging an internally-threaded block connected to a lower corner of said curtain so that when said motor is activated, said motor rotates each of said gear arrangements which, in turn, rotate said threaded shaft extending therefrom to reposition said blocks relative to said lower cross-bar members and effectuate movement of said curtain between said first position and said second position; and, a combination key lock and mometary actuation switch for said motor for locking and securing said curtain in said first position when the motor vehicle is not in use.

18. The security device according to claim 17, wherein said protective curtain is made of aluminum.

19. The security device according to claim 17, wherein said curtain further conceals a radio for the motor vehicle.

20. The security device according to claim 17, wherein said curtain further conceals a trunk release device for the motor vehicle.

21. A security device for a motor vehicle, comprising:

a movable protective curtain made of metal that is horizontally-segmented with hinges having sufficient area and strength so that said curtain is capable of concealing and preventing the unauthorized use of control pedals of the motor vehicle, said curtain also being of sufficient flexibility so that it is adjustable between a first position, wherein it conceals the control pedals, and a second position, wherein it allows access to the control pedals and operation of the vehicle;

a frame, having an upper cross-bar member and a lower cross-bar member, to contain said protective curtain, said frame being adapted to be fixed to the interior of the vehicle both above and below said control pedals and being constructed and arranged to provide means for guiding the movement of said curtain when adjusting the same between said first and said second positions;

a reversible electric motor located on an outer surface of said lower cross-bar member of said frame, said motor being connected to two bevel gear arrangements positioned at opposite ends of said lower cross-bar member with each of said gear arrangements having a threaded shaft extending through an opening in said lower cross-bar member and operatively engaging an internally-threaded block connected to a lower corner of said curtain so that when said motor is activated, said motor rotates each of said gear arrangements which, in turn, rotate said threaded shaft extending therefrom to reposition said blocks relative to said lower cross-bar members and effectuate movement of said curtain between said first position and said second position; and a combination key lock and momentary actuation switch for said motor for locking and securing said curtain in said first position when the motor vehicle is not in use.

* * * * *